United States Patent [19]

Owens

[11] Patent Number: 4,876,854

[45] Date of Patent: Oct. 31, 1989

[54] SOLAR ENERGY THERMALLY POWERED ELECTRICAL GENERATING SYSTEM

[75] Inventor: William R. Owens, Rockford, Ill.

[73] Assignee: Sundstrand Corp., Rockford, Ill.

[21] Appl. No.: 199,459

[22] Filed: May 27, 1988

[51] Int. Cl.$^4$ ................................................ F03G 7/02
[52] U.S. Cl. ...................................... 60/641.8; 60/652; 60/659; 60/660
[58] Field of Search ............. 60/641.8, 641.13, 641.14, 60/641.15, 652, 659, 660, 667, 668; 126/421, 422, 436

[56] References Cited

U.S. PATENT DOCUMENTS

| | | | |
|---|---|---|---|
| 3,903,699 | 9/1975 | Davis | 60/659 |
| 4,289,836 | 9/1981 | Lemelson | 429/61 |
| 4,304,823 | 12/1981 | Lemelson | 429/19 |
| 4,415,847 | 11/1983 | Galloway | 320/2 |
| 4,549,127 | 10/1985 | Taylor et al. | 320/21 |
| 4,553,081 | 11/1985 | Koenck | 320/43 |
| 4,560,937 | 12/1985 | Finger | 324/433 |
| 4,575,679 | 3/1986 | Chung et al. | 324/427 |
| 4,577,270 | 3/1986 | Sugano et al. | 364/151 |
| 4,583,034 | 4/1986 | Martin | 320/21 |
| 4,635,182 | 1/1987 | Hintz | 364/138 |

OTHER PUBLICATIONS

"Estimation and Prediction of Unmeasured Variables in Steel Mill Soaking Pit Control System", IEEE Transactions on Automatic Control, vol. AC-28, pp. 372-380, Mar. 1983, by V. Lumelsky.

"Applied Optical Estimation" by A. Gelb, published 1974 by MIT Press, Cambridge, Mass.

"An Integrated Analytic Tool and Knowledge-Based System Approach to Aerospace Electric Power System Control," Oct. 1986, Society of Aeronautical Engineers Conference, by William R. Owens et al.

"A New Approach to Linear Filtering and Prediction Problems", R. E. Kalman, Journal of Basic Engineering, Mar. 1960, pp. 35-45.

"New Results in Linear Filtering and Prediction Theory", Journal of Basic Engineering, Mar. 1961, pp. 95-107, by R. E. Kalman and R. S. Bucy.

*Primary Examiner*—Stephen F. Husar
*Attorney, Agent, or Firm*—Antonelli, Terry & Wands

[57] ABSTRACT

A thermally powered electrical generating system for use in a space vehicle is disclosed. The rate of storage in a thermal energy storage medium is controlled by varying the rate of generation and dissipation of electrical energy in a thermally powered electrical generating system which is powered from heat stored in the thermal energy storage medium without exceeding a maximum quantity of heat. A control system (10) varies the rate at which electrical energy is generated by the electrical generating system and the rate at which electrical energy is consumed by a variable parasitic electrical load to cause storage of an amount of thermal energy in the thermal energy storage system at the end of a period of insolation which is sufficient to satisfy the scheduled demand for electrical power to be generated during the next period of eclipse. The control system is based upon Kalman filter theory.

13 Claims, 2 Drawing Sheets

SOLAR ENERGY THERMALLY POWERED ELECTRICAL GENERATING SYSTEM

The invention described herein was made in the performance of work under NASA contract NAS 3-24666 and is subject to the provisions of Section 305 of the National Aeronautics and Space Act of 1958, Public Law 85-568 (72 Stat. 435; 42 USC 2457).

TECHNICAL FIELD

The present invention relates to solar energy thermally powered electrical generating systems. More particularly, the present invention relates to solar energy electrical power generating systems utilizing a thermal energy storage medium which stores a variable quantity of heat which should not exceed a maximum quantity of heat and further which does not have any mechanism for controlling the amount of sunlight incident on the thermal storage medium to control the amount of thermal energy which is stored.

BACKGROUND ART

Solar powered thermal energy storage systems are known. Some systems have mechanisms for varying the amount of sunlight incident on a solar energy collector to regulate the amount of thermal energy being stored. Furthermore, many thermal energy storage systems are not limited in the amount of thermal energy which may be stored.

A space vehicle solar energy thermally powered electrical generating system is not a conventional application of solar energy. It is not desirable to directly regulate the amount of solar energy being absorbed by a thermal storage medium in a spacecraft because of the complexity of the requisite controls Furthermore because of the high energy content of solar energy above the earth's atmosphere and the limited size of the thermal energy storage medium in a space vehicle, the maximum thermal capacity of the thermal storage medium may be exceeded during periods of insolation. It is known that electric power systems for aerospace applications may be controlled utilizing state estimation and control principles. See "An Integrated Analytic Tool and Knowledge-Based System Approach to Aerospace Electric Power System Control", October, 1986, Society of Aeronautical Engineers Conference by William R. Owens, Eric Henderson and Kapal Gandikota. As described therein, state estimation is used to compute the state of the system from measurement of system variables with the state estimation being used for controlling the system.

Furthermore, it is known that actual system performance may be controlled by mathematically modeling system components to be controlled with differential equations when data is insufficient to control system performance by conventional control principles. This technique is known as "Kalman" filtering. See "A New Approach to Linear Filtering and Prediction Problems", R. E. Kalman, Journal of Basic Engineering, March 1960, pp 35-45 and "New Results in Linear Filtering and Prediction Theory", Journal of Basic Engineering, March, 1961, pp 95-107 by R. E. Kalman and R. S. Bucy. Kalman filtering has been utilized to perform estimation and prediction of unmeasured variables in a system to be controlled. See "Estimation and Prediction of Unmeasured Variables in Steel Mill Soaking Pit Control System", IEEE Transactions on Automatic Control, Vol. AC-28, pp 372-380, March, 1983 by V. Lumelsky. Additional publications describing further applications of Kalman filtering are "Applied Optical Estimation", The MIT Press, Cambridge, Mass., 1974 by A. Gelb and "IEEE Transactions on Automatic Control" Vol. AC-16, No. 6, December, 1976.

U.S. Pat. Nos. 4,577,270 and 4,635,182 disclose examples of Kalman filtering used in control systems in which insufficient data exists to calculate a state estimate based on conventional control principles using measured data. Kalman filtering theory may be applied to provide state estimations when insufficient data exists for using conventional control theory in those situations when it is possible to mathematically model by differential equations the component parts of the system to be controlled. Kalman filtering theory is applicable to both current and future state estimates with the future state estimate being based upon extrapolating the differential equations used to mathematically model the current state estimate into the future.

Heat pipes with integral thermal energy storage have been utilized by the Los Alamos National Laboratory in thermal energy storage systems. The Arizona State University has verified that a sodium heat pipe with lithium hydroxide thermal energy canisters successfully functions as a thermal energy storage medium. The lithium hydroxide thermal energy storage medium is characterized by a solid phase which has a first linear relationship between the change in heat (Q) and the change of temperature (T) which has a relatively high slope. Once sufficient energy is absorbed by the lithium hydroxide system, the solid phase begins to change state to a liquid state. The relationship of Q versus T in the state in which there is a phase change to the liquid state is characterized by a second linear relatively small slope in which large amounts of heat may be added to the lithium hydroxide without substantially changing the temperature of the thermal storage medium. Finally, once all of the lithium hydroxide storage medium has changed to the liquid state, the relationship of Q versus T increases again at relatively high slope.

There is no known way of directly measuring the actual heat stored in the lithium hydroxide system during operation in the second slope because of the small slope with the analogy being measuring the amount of electrical energy stored in a storage battery. Moreover, it is undesirable to operate the thermal energy storage medium in either the first or third slopes of the Q versus T characteristic.

DISCLOSURE OF INVENTION

The present invention provides a solar energy thermally powered electrical generating system useful for space vehicles in which the thermal energy storage medium stores a variable quantity of heat which should not exceed a maximum quantity of heat and further has no controls for controlling the amount of sunlight upon the solar energy collector of the solar energy storage medium. The maximum quantity of heat preferably is the maximum quantity of heat which may be stored in the lowest slope of a heat versus temperature characteristic of a heat storage medium such as the prior art lithium hydroxide system. With the present invention, the quantity of thermal energy stored by the thermal energy storage medium during periods of insolation is controlled by varying the rate of electrical power generation by a thermally powered electrical generation system coupled to the thermal storage medium so that the amount of thermal energy stored in the thermal storage medium is equal to or greater than the amount of thermal energy necessary to power the electrical generating system during periods of eclipse to satisfy scheduled demands for the generation of electrical power and further does not exceed the maximum quantity of heat. Control of the rate of storage of thermal energy by varying the rate of electrical power generation and consumption during periods of insolation is accomplished by varying one or more system variables which in a preferred embodiment are the control of the quantity of working fluid circulating in the thermally powered electrical generating system and the amount of electrical energy being dissipated by a parasitic electric load. If the rate of thermal energy storage during periods of insolation exceeds that which is necessary to satisfy energy storage requirements to generate a scheduled amount of electrical power to be consumed during the next period of eclipse, the resistance of the parasitic electric load is decreased and the rate of power generation is increased to dissipate additional power which lessens the amount of thermal energy being stored in the thermal energy storage medium to a level at or below the maximum quantity of heat but above the level necessary to meet the scheduled demand for electrical power. If the rate of thermal energy storage during periods of insolation is less than that which is necessary to satisfy energy storage requirements to generate a scheduled amount of electrical power during the next period of eclipse, the amount of working fluid circulating in the thermally powered electrical generation system is reduced and the resistance of the parasitic load resistor is increased to permit sufficient thermal energy to be stored during the period of insolation to meet the scheduled demand during the next period of eclipse while not exceeding the maximum quantity of heat.

A solar energy thermally powered electrical generating system having a thermal energy storage medium which stores a variable quantity of heat which should not exceed a maximum quantity of heat in which solar energy is absorbed by the thermal storage medium during periods of insolation and is released during periods of eclipse in accordance with the invention includes a thermally powered electrical generating system, thermally coupled to the thermal energy storage medium, for generating electrical energy from the thermal energy stored in the thermal storage medium which is variable in magnitude in accordance with a first control signal; a means for varying the rate of generation of the electrical energy by the electrical generating system as a function of a scheduled demand of electrical power to be consumed by an electrical load coupled to the electrical generation system; and a controller, coupled to the electrical generating system and to the means for varying the rate of generation, for generating the first control signal to control the rate of electrical power generated from the thermal energy stored in the thermal energy storage medium and providing stored thermal energy to meet the scheduled demand of electrical power during periods of eclipse and preventing the storage of an amount of thermal energy during periods of insolation exceeding the maximum quantity of heat. The invention further includes a variable parasitic electrical load, coupled to the thermally powered electrical generation system, for dissipating electrical energy as a function of a second control signal and wherein the control system also generates the second control signal and predicts during a period of insolation if the scheduled demand for electrical power will cause the electrical generation system to consume more thermal energy than a predicted amount of thermal energy to be stored during the period of insolation necessary to generate the scheduled demand of electrical power and if the predicted amount of thermal energy to be consumed is less than the predicted amount of thermal energy to be stored, which exceeds the maximum quantity of heat, a determination is made if more electrical power is required by the electrical load and if the electrical load does not require more power the second control signal is varied to decrease resistance of the variable parasitic electrical load along with the first control signal being varied to increase the rate of electrical power generation to cause less thermal energy to be stored in the thermal energy storage so that the thermal energy to be stored does not exceed the maximum quantity of heat and if the predicted amount of thermal energy to be consumed is greater than the predicted amount of thermal energy to be stored the first control signal is varied to decrease the rate at which electrical power is generated by the electrical generation system and the second control signal is varied to increase the resistance of the variable parasitic load to permit more thermal energy to be stored but not an amount which exceeds the maximum quantity of heat. A preferred environment of the system is a space vehicle and the electrical load is the electrical power drawing devices contained in the space vehicle.

The controller includes an estimator, responsive to at least a first control signal of a thermal energy electrical generating system and to at least one measured variable of the operation of the thermal energy electrical generating system for estimating an amount of stored thermal energy contained in the thermal energy storage and producing a first signal which represents the estimated thermal energy and a second signal which represents the estimated resistance of the parasitic load; a predictor, responsive to the first signal and the second signal, for predicting the amount of thermal energy to be stored in the thermal energy storage medium in the future and the resistance of the parasitic load in the future and producing a third signal representing the predicted amount of thermal energy in the future and a fourth signal representing the predicted resistance of the parasitic load in the future; a scheduler, responsive to the predictor and to the scheduled demand for electrical power for producing fifth and sixth signals for respectively controlling the rate at which the thermal energy electrical generating system generates electrical power and controlling the resistance of the variable resistance parasitic load such that the fifth signal commands an increase in the rate at which electrical power is generated and the sixth signal commands a decrease in the resistance of the parasitic load when the predicted amount of thermal energy to be stored in the future is greater than the predicted amount of thermal energy to be consumed by the generation of the scheduled demand for electrical power and exceeds the maximum quantity of heat and such that the fifth signal commands a decrease in the rate at which electrical power is generated and the sixth signal commands an increase in the resistance of the parasitic load when the predicted amount of thermal energy to be stored in the future is less than the predicted amount of thermal energy to be consumed by the generation of the scheduled demand for electrical power and is insufficient to meet a scheduled demand for electrical power; and an error signal generator, responsive to the first, second, fifth and sixth signals, for producing an error signal proportional to the difference between the first and fifth signals and an error signal proportional to the difference between the second and sixth signals; and a controller, responsive to the error signals, for producing the first and second control signals.

The thermal energy powered electrical generating system includes a turbine driving an electrical power generating system; a source of heated fluid which is thermally coupled to the thermal storage medium for supplying heated fluid to the turbine to power the turbine; and a fluid return for returning fluid discharged from the turbine back to the source of heated fluid to apply heat to the returned fluid; and a pump, disposed in the fluid return, for varying the rate of return of fluid discharged from the turbine in response to the first control signal. A calibrator is provided for calibrating the estimator and the predictor. Calibration is performed by coupling the calibration system to the scheduler and providing a means for changing the amount of electrical power being generated by the thermal energy electrical generating system until the thermal storage medium has a change in physical state with the estimator and predictor being calibrated by using known information of the thermal storage medium. The known system information is a rate of change of temperature of the thermal energy storage medium as a function of added heat for a solid state and a liquid state of the thermal energy storage medium.

BEST MODE OF CARRYING OUT THE INVENTION

Figure 1:
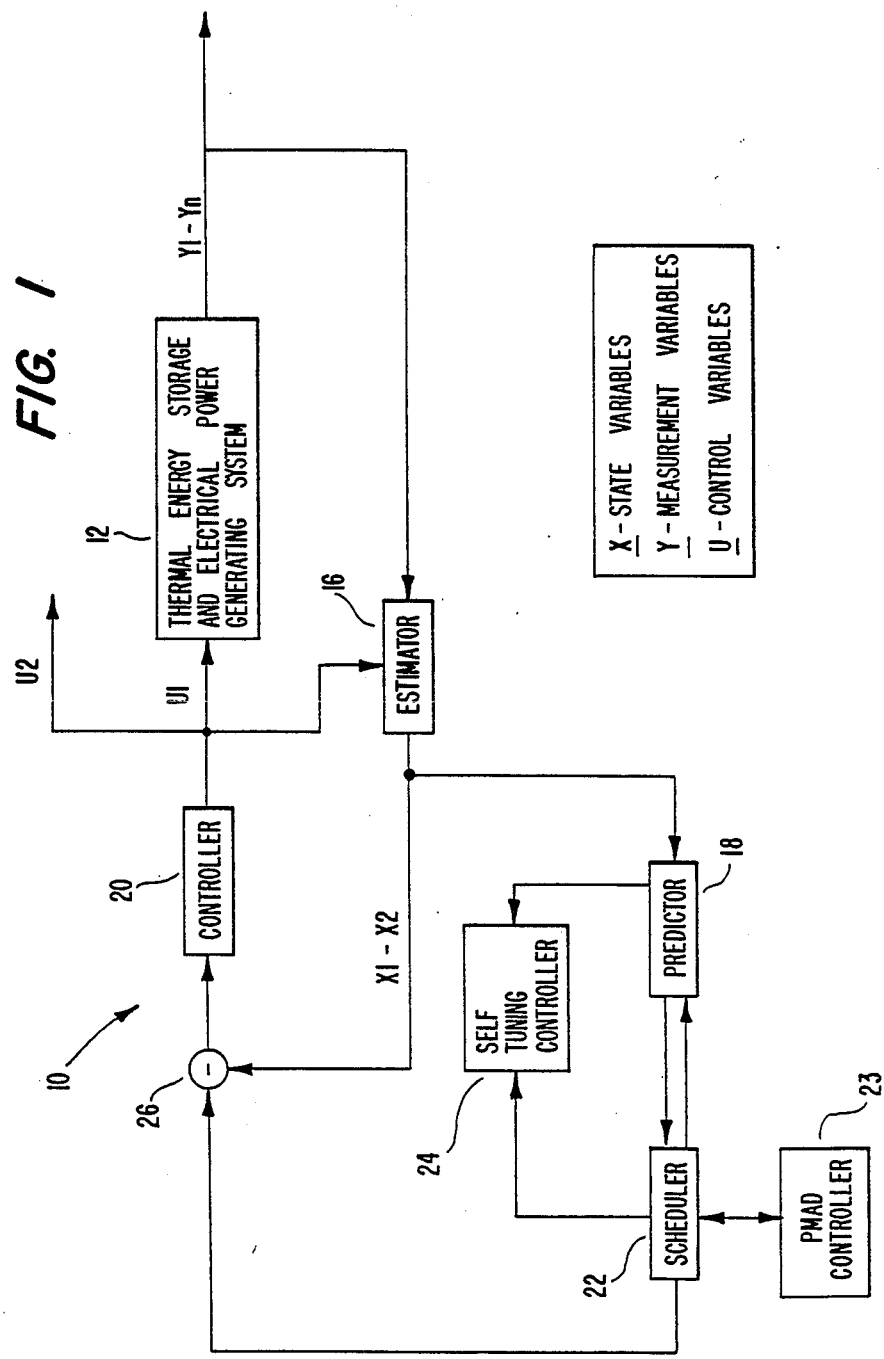
FIG. 1 is a block diagram of the control system of the present invention.

FIG. 1 illustrates a block diagram of the present invention utilized for controlling the amount of solar energy stored in a thermal energy storage medium which stores thermal energy during periods of insolation to satisfy energy requirements of a thermally powered electrical generating system necessary to meet scheduled electric demands during periods of eclipse with the variable amount of thermal energy not exceeding a maximum quantity of heat to maintain controlled operation of the thermal energy storage medium. The maximum quantity of heat preferably is the maximum quantity of heat which may be stored in the lowest slope of a heat versus temperature characteristic of a heat storage medium. The present invention utilizes known Kalman filtering theory to control of a pair of control variables U1 and U2 which respectively control the rate of electrical power generation by the thermal energy electric power generator and the rate at which electrical energy is dissipated by a variable resistance parasitic electrical load described with reference to FIG. 2. The control system 10 has a thermal energy storage medium contained within the thermal energy storage and electrical power generating system 12 which is preferably based on the prior art lithium hydroxide heat storage medium described above. However, it should be understood that other types of heat storage mediums may be used. Storage of energy in the thermal energy storage medium is maintained by the system within the top portion of the operation characteristic of the thermal energy storage medium in which the rate of change of heat versus temperature of the thermal storage medium as a function of incident thermal energy is the smallest slope of the thermal storage medium. The rate of thermal energy storage in the thermal energy storage medium is controlled by a control signal U1 which controls the rate of pumping of fluid to the heater of the thermal energy storage as described below with reference to FIG. 2. The rate of consumption of electrical energy is regulated by a control signal U2 applied to a parasitic load described below with reference to FIG. 2. A number of measured variables of the thermal energy storage are utilized by the control system 10 of the present invention which include the temperature of the heat pipes contained in the thermal energy storage, the level of insolation on the thermal energy storage which may be sensed by a photocell or phototransistor, the real electrical power output of the alternator of the thermal energy storage medium as described below with reference to FIG. 2 and the net thermal output of the receiver which is a function of the flow rate and the temperature of the fluid leaving the receiver. These variables are indicated by the legends "$Y_1$-$Y_n$" as output from the thermal energy storage and electrical power generating system 12. It should be understood that other combinations of measured system variables may be utilized. Measurement noise is present for each of the above referenced measured variables $Y_1$-$Y_n$ which is representative of the amount of noise of those variables in the system to make predicted operation agree with actual operation. Estimator 16, which is implemented by a Kalman filter, estimates a number of state variables including the estimated quantity of heat stored in the thermal energy storage of the thermal energy storage and electrical power generating system 12 and the resistance of the parasitic load as described below with reference to FIG. 2. As is known in the art, the implementation of the estimator 16 in a Kalman filter is based upon the physical operation characteristics of the component parts of the system and standard mathematical modeling techniques in the time domain based upon first order differential equations (state-space). The Kalman filter implementation of the estimator 16 performs the estimation of the amount of thermal energy stored in the thermal energy storage medium which is analogous to estimating the amount of electrical energy stored in a battery. The estimator 16 utilizes a mathematical model based upon first order differential equations of each of the elements of the system of FIG. 2 including the receiver 32, alternator 38, turbine 36, pump 48 and condenser 44. Modeling of these particular system components is based upon standard mathematical modeling techniques utilizing known physical operation characteristics of each of the component parts of the system. The state variables outputted by the estimator 16 include the important state variables in the operation of the system which are a first signal which is the estimation X1 of the thermal energy stored in the thermal energy storage system of the thermal energy storage and electrical power generator 12 and a second signal which is the estimation X2 of the parasitic resistance of the electrical load.

The output of the estimator 16 is also applied to a predictor 18 which provides a third signal which is a future estimate of the amount of stored energy to be stored in the thermal energy storage medium at the end of the next period of insolation or beginning of the next subsequent period of eclipse and a fourth signal which is a future estimate of the parasitic resistance of the load resistance at the end of the next period of insolation or beginning of the next subsequent period of eclipse. By estimating the amount of thermal energy which will be stored in the thermal energy storage medium 12 at the end of the next period of insolation and the resistance of the parasitic load resistance it is possible for the system to determine if the amount of thermal energy stored in the thermal energy storage medium will be sufficient to satisfy scheduled electrical power generation demands during the next period of eclipse. The predictor 18 is based upon the same first order differential equations utilized in the estimator 16 and further includes a mathematical model of the controller 20 as discussed above. The modeling of the predictor 18 based upon Kalman filter theory is similar to the modeling of the estimator 16 with an extension of the time domain to the end of the next period of insolation. The scheduler 22 is a programmed controller which receives from the power management and distribution (PMAD) controller 23 an estimation of the electrical power to be drawn in the future. The scheduler 22 determines if the amount of thermal energy predicted by the predictor 18 to be stored in the thermal energy storage medium 12 at the end of the next period of insolation will be less than or greater than the amount of thermal energy which must be stored in the thermal energy storage medium to satisfy the energy requirements of the electrical generating system to generate the scheduled amount of electrical power during the period of eclipse. The outputs of the scheduler 22 are a fifth signal used for controlling the pump of the electrical generating system described below with reference to FIG. 2 and a sixth signal used for controlling the amount of resistance of the parasitic load resistance. If the scheduler 22 determines that the amount of thermal energy which will be stored in the thermal energy storage medium at the end of the period of insolation is greater than that necessary to satisfy the amount of thermal energy which must be stored to generate the scheduled amount of electrical power and exceeds the maximum quantity of heat, the scheduler first interrogates the PMAD controller 23 if the electrical load could utilize more electrical power being generated at the present time. If the answer is "yes" to the interrogation, the scheduler 22 will increase the rate of generation of electrical energy by the electrical generating system to lower the amount of thermal energy to be stored at the end of the next period of insolation. Furthermore, the resistance of the parasitic load is increased. However, if the electrical load will not receive additional electrical energy at the present time, the scheduler 22 changes the sixth signal to decrease the resistance of the parasitic load and changes the fifth signal to increase the rate of power generation discussed below with reference to FIG. 2 to increase the rate of power dissipation. The increase in the amount of power being generated is determined so as to consume an amount of thermal energy which lessens the amount of thermal energy being stored in the thermal energy storage medium to a level less than the maximum quantity of heat and greater than a minimum amount to satisfy the scheduled amount. On the other hand, if the scheduler 22 determines that the predicted amount of thermal energy to be stored in the thermal energy storage medium 12 at the end of the period of insolation is not sufficient to satisfy the necessary amount of thermal energy which must be stored to generate the scheduled amount of electrical power, the scheduler 22 lessens the rate of electrical generation by the electrical generation system by varying the fifth signal and increases the resistance of the parasitic load resistance by varying the sixth signal to a level sufficient to increase the rate of storage of thermal energy in the thermal energy storage medium to meet the scheduled demand and not exceed the maximum quantity of heat and informs the PMAD of the lesser amount of power available. A self-tuning controller 24 is provided which causes the thermal energy storage medium to be heated to a point at which the slope of the energy storage versus temperature characteristic increases as a consequence of all of the energy storage medium being in the liquid state. By forcing the thermal energy storage medium 12 to an inflection point in the energy storage versus temperature characteristic, the system is able to determine a calibration point for the mathematical models utilized in the estimator 16 and predictor 18, so that the actual system operation agrees with the predicted system operation. Error signal generator 26 takes the difference between the outputs of the scheduler 22 and the estimator 16 to generate first and second error signals which are applied to controller 20. The first error signal is equal to the difference of the first and fifth error signals and the second error signal is equal to the differences of the second and sixth signals. The controller generates the first control signal U1 for controlling the pump 48 illustrated in FIG. 2 of the thermal energy storage and electrical power generating system 12 and the second control signal U2 for controlling the resistance of the parasitic load 42 illustrated in FIG. 2. If the outputs from the estimator 16 agree with the outputs from the scheduler 22, the error signal generator 26 does not apply any error signal to the controller 20 which maintains the same level of the control signals U1 and U2 to maintain steady state operation. The gain of the controller 20 is chosen to maintain the desired operation of the thermal energy storage and electrical power generation system and the parasitic load described below.

Figure 2:
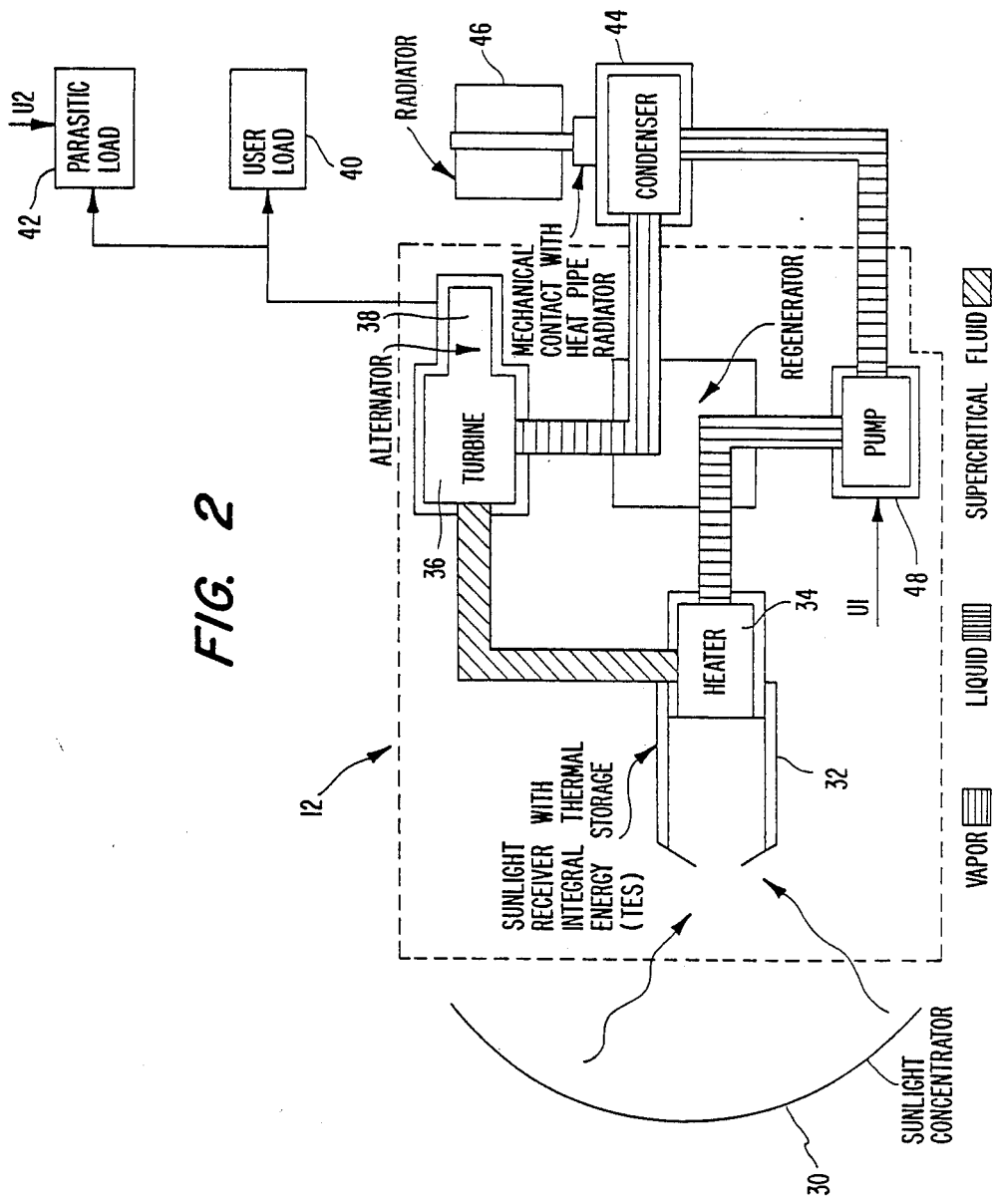
FIG. 2 is a diagram illustrating the thermal energy storage medium and electrical generating system controlled with the control system of FIG. 1.

FIG. 2 illustrates a block diagram of the thermal energy storage and electrical power generator 12 of FIG. 1 as implemented in a space vehicle. Incident sunlight is collected by a sunlight concentrator 30 which may be a parabolic mirror. Sunlight is imaged by the parabolic mirror on the inside surface of the sunlight receiver with integral thermal energy storage 32. As described above, the sunlight receiver may be based upon prior art thermal energy storage mediums including a lithium hydroxide energy storage in heat pipes. The receiver is in thermal contact with a heater 34 which heats a working fluid such as toluene. Toluene heated to a super critical temperature is outputted by the heater and applied to the turbine 36 which drives an alternator 38 which may be a conventional three phase alternator. The output of the alternator 38 is applied to a user load 40 which represents the actual electric loads of the space vehicle to be powered during normal operation or power conditioning equipment to convert the electric power to the form required by the loads and to a parasitic load 42 which is utilized for dissipating electrical power outputted by the alternator 38 when the rate of storage of thermal energy in the thermal energy storage medium 12 is greater than that necessary to satisfy the scheduled demand for electrical power and would exceed the quantity of maximum heat. Vapor from the turbine 36 is applied to condenser 44 which is thermally coupled to radiator 46 to dissipate the heat from the condenser. The condensed toluene is circulated to pump 48 which is powered by a variable speed motor (not illustrated) under the control of control signal U1 for controlling the rate at which liquid toluene is applied to the heater 34 to vary the rate of thermal energy which is outputted from the heater with the supercritical fluid. It should be noted that the control signals U1 and U2 are respectively applied to the pump 48 and parasitic load 42 as described above.

While the invention has been described in terms of its preferred embodiment, it should be understood that numerous modifications may be made thereto without departing from the spirit and scope of the invention as defined in the appended claims. It is intended that all such modifications fall within the scope of the appended claims.

What is claimed is:

1. A solar energy thermally powered electrical generating system having a thermal energy storage medium which stores a variable quantity of heat which should not exceed a maximum quantity of heat in which solar energy is absorbed by the thermal storage medium during periods of insolation and is released during periods of eclipse comprising:
   (a) a thermally powered electrical generating system, thermally coupled to the thermal energy storage medium, for generating electrical energy from thermal energy stored in the thermal energy storage medium which is variable in magnitude in accordance with a first control signal;
   (b) means for varying the rate of generation of electrical energy by the electrical generating system as a function of a scheduled demand of electrical power to be consumed by an electrical load coupled to the electrical generating system; and
   (c) control means, coupled to the thermally powered electrical generating system and to the means for varying the rate of generation, for generating the first control signal to control the rate of electrical power generation from the thermal energy stored in the thermal energy storage medium and to provide stored thermal energy to meet the scheduled demand of electrical power during periods of eclipse and to prevent the storage of an amount of thermal energy during periods of insolation exceeding the maximum quantity of heat.

2. A solar energy thermally powered electrical generating system in accordance with claim 1 further comprising:
   (a) a variable parasitic electrical load, coupled to the thermally powered electrical generating system, for dissipating electrical energy as a function of a second control signal and wherein;
   (b) the control means also generates the second control signal and predicts during a period of insolation if the scheduled demand for electrical power will cause the electrical generating system to consume more thermal energy than a predicted amount of thermal energy to be stored during the period of insolation necessary to generate the scheduled demand of electrical power, and if the predicted amount of thermal energy to be consumed is less than the predicted amount of thermal energy to be stored which exceeds the maximum quantity of heat, a determination is made if more electrical power is required by the variable parasitic electrical load and if the electrical load does not require more power, the second control signal is varied to decrease resistance of the variable parasitic electrical load and the first control signal is varied to increase the rate of electrical power generation by the electrical generating system to cause less thermal energy to be stored in the thermal energy storage so that the thermal energy to be stored does not exceed the maximum quantity of heat and if the predicted amount of thermal energy to be consumed is greater than the predicted amount of thermal energy to be stored, the first control signal is varied to decrease the rate at which electrical power is generated by the electrical generating system and the second control signal is varied to increase the resistance of the variable parasitic electrical load to permit more thermal energy to be stored but not an amount which exceeds the maximum quantity of heat.

3. A solar energy thermally powered electrical generating system in accordance with claim 1 wherein:
   the maximum quantity of heat is a maximum quantity of heat which may be stored in a lowest slope of a heat versus temperature characteristic of the thermal energy storage medium 4. A solar energy thermally powered electrical generating system in accordance with claim 3, wherein:
   the lowest slope is contained within a liquid-solid phase of the thermal energy storage medium.

5. A solar energy storage medium in accordance with claim 4, wherein:
   the thermal energy storage medium utilizes lithium hydroxide.

6. A solar energy thermally powered electrical generating system in accordance with claim 1 wherein:
   the system is disposed in a space vehicle.

7. A solar energy thermally powered electrical generating system in accordance with claim 2 wherein:
   the electrical load is comprised of electrical power drawing devices contained in the satellite.

8. A solar energy thermally powered electrical generating system in accordance with claim 1 wherein the control means comprises:
   (a) an estimator means, responsive to at least the first control signal and to at least one measured variable of the operation of the thermally powered electrical generating system for estimating an amount of stored thermal energy contained in the thermal energy storage and producing a first signal proportional to the estimated thermal energy and a second signal proportional to an estimated resistance of the variable parasitic electrical load;
   (b) predictor means, responsive to the first signal, and the second signal for predicting the amount of energy to be stored in the thermal energy storage medium in the future and the resistance of the variable parasitic electrical load in the future and producing a third signal proportional to the predicted amount of thermal energy in the future and a fourth signal proportional to the predicted resistance of the variable parasitic load resistance;
   (c) a scheduler, responsive to the signals from the predictor means, for predicting the scheduled demand for electrical power, and for producing a fifth signal for respectively controlling the rate at which the electrical generating system generates electrical power and a sixth signal for controlling the resistance of the variable parasitic load such that the fifth signal commands an increase in the rate at which electrical power is generated and the sixth signal commands a decrease in the resistance of the variable parasitic electrical load when the predicted amount of thermal energy to be stored in the future is greater than the predicted amount of thermal energy to be consumed by the generation of the scheduled demand for electrical power and exceeds the heat maximum capacity and such that the fifth signal commands a decrease in the rate at which electrical power is generated and the sixth signal commands an increase in the resistance of the variable parasitic electrical load when the predicted amount of thermal energy to be stored in the future is less than the predicted amount of thermal energy to be consumed by the generation of the scheduled demand for electrical power and is insufficient to meet a scheduled demand for electrical power;

(d) an error signal generator, responsive to the first, second, fifth and sixth signals, for producing error signals respectively proportional to the difference between the first and fifth signals and second and sixth signals; and (e) a controller, responsive to the error signals, for producing the first and second control signals.

9. A solar energy thermally powered electrical generating system in accordance with claim 8 wherein:

a noise component is present in each of the measured variables which causes actual system operation to agree with predicted system operation.

10. A solar energy thermally powered electrical generating system in accordance with claim 5 wherein the thermally powered electrical generating system comprises:

(a) a turbine driving an electrical power generating means;

(b) a source of heated fluid which is thermally coupled to the thermal storage medium for supplying heated fluid to the turbine to power the turbine;

(c) a fluid return for returning fluid discharged from the turbine back to the source of heated fluid to apply heat to the returned fluid; and (d) a pump, disposed in the fluid return for varying the rate of return of fluid discharged from the turbine in response to the first control signal.

11. A solar energy thermally powered electrical generating system in accordance with claim 8 further comprising:

means for calibrating the estimator and predictor means.

12. A solar energy thermally powered electrical generating system in accordance with claim 11 wherein the means for calibrating comprises:

(a) means, coupled to the scheduler and the predictor means, for changing the amount of electrical power being generated by the thermally powered electrical generating system and the resistance of the variable parasitic electrical load until the thermal storage medium has a change in physical state and wherein;

(b) the estimator means is calibrated by utilizing known information of the thermal storage medium.

13. A solar energy power generating system in accordance with claim 12 wherein:

the known system information is a rate of change of temperature of the thermal energy storage medium as a function of added heat for a solid state and a liquid state of the thermal energy storage medium.

* * * * *